United States Patent [19]

Kofink et al.

[11] 4,262,224

[45] Apr. 14, 1981

[54] OIL COOLING FOR AN ELECTRICAL GENERATOR

[75] Inventors: Wolfgang Kofink, Aichwald; Georg Binder, Bechhofen, both of Fed. Rep. of Germany

[73] Assignee: Robert Bosch GmbH, Stuttgart, Fed. Rep. of Germany

[21] Appl. No.: 44,641

[22] Filed: Jun. 1, 1979

[30] Foreign Application Priority Data

Jun. 29, 1978 [DE] Fed. Rep. of Germany ....... 2828473

[51] Int. Cl.³ .............................................. H02K 9/00
[52] U.S. Cl. .................................. 310/54; 310/68 D; 310/90; 310/254
[58] Field of Search ..................... 310/52–54, 310/58, 59, 64, 65, 68 R, 68 D, 89, 90, 263, 266, 254

[56] References Cited

U.S. PATENT DOCUMENTS

| | | | |
|---|---|---|---|
| 2,987,637 | 6/1961 | Bertsche et al. | 310/54 |
| 3,089,045 | 5/1963 | Derks | 310/54 X |
| 3,184,624 | 5/1965 | Solomon | 310/54 |
| 3,562,564 | 2/1971 | Potter | 310/54 |
| 3,648,085 | 3/1972 | Fujii | 310/54 |
| 3,733,503 | 5/1973 | Potter | 310/54 X |

*Primary Examiner*—Mark O. Budd
*Attorney, Agent, or Firm*—Frishauf, Holtz, Goodman & Woodward

[57] ABSTRACT

For more effective cooling of directly driven claw-pole, typically automotive alternators, a system of internal passageways is provided through which cooling oil is forced from the pressurized engine oil supply system. The oil flows directly over surfaces of the rectifiers or their heat sink, the exciter core, and the stator housing. A portion of the oil is branched off in a metered quantity at the inlet directly to a shaft bearing, which it cools and lubricates. Various passageways systems are described, including one which permits electrical feedthroughs and the diodes to be mounted dry. A particular configuration is described for a shaft bearing, in which between an armor bushing and a cast bearing support hub there are annular oil channels connected to longitudinal oil channels to evenly distribute the pressurized oil around the bearing.

16 Claims, 9 Drawing Figures

OIL COOLING FOR AN ELECTRICAL GENERATOR

The present invention relates to an electrical generator, particularly one which is cooled with oil under pressure.

BACKGROUND AND PRIOR ART

Electrical generators in which all the windings are located in stationary parts are known. Such generators are used especially as interdigited alternators for use with motor vehicle engines. A windingless generator rotor is coupled directly to a shaft to minimize the size and weight of the generator and eliminate brushes or other sliding electrical connections. It is also known to cool these generators with oil from a pressurized oil supply. However, for the generators proposed thus far, the cooling has been insufficient under high performance operating conditions.

THE INVENTION

It is an object of the invention to provide more effective oil cooling for a generator of the above type.

Briefly, cooling oil is supplied from a remote system to passageways which lead it to come into direct contact with the stator housing and the exciter or field core and which also supply it to a bearing for the shaft which carries the rotor. This permits the generator to function at a higher rotational speed and to be less susceptible to thermal overloading, thereby making it especially suitable for use with a turbine, for which the generator may not have separate bearings of its own. In accordance with a particularly suitable arrangement, the oil flows along annular passageways formed in part by grooves in the outer perimeter of a stator housing. The oil also flows through passageways in the exciter core and over a major cooling surface of a rectifier assembly heat sink. In a preferred form, all the electrical lines and terminals are located outside the network of oil passageways to provide ready access and only one side of the heat sink is in contact with the oil, so that a voltage regulator can be mounted on the opposite, dry side. Provisions are made to separately meter a predetermined quantity of the supply oil to a shaft bearing for lubrication.

DRAWINGS

FIG. 1b is a schematic diagram of the oil flow in the generator of FIG. 1a;

FIG. 7b is a schematic diagram of the oil flow in the generator of FIG. 7a;

FIG. 8a is a partial longitudinal section of a bearing assembly for a generator such as that of FIG. 7a;

FIG. 8b is a transverse section of the assembly of FIG. 8a; and

Figure 1A:
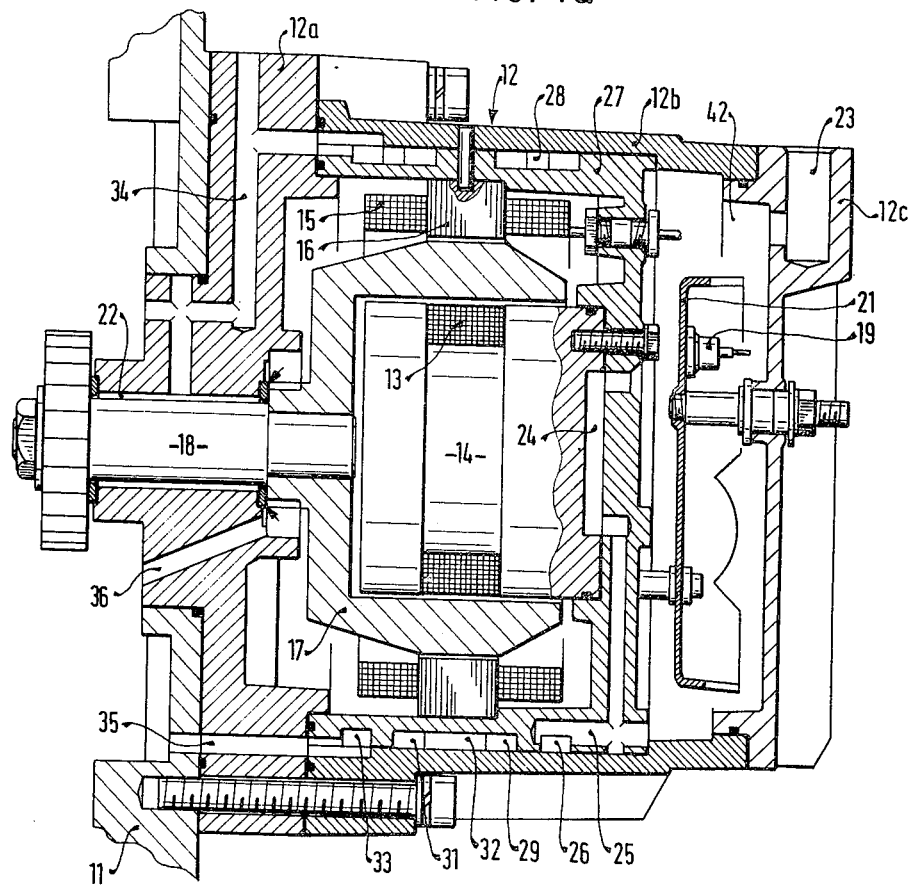
FIG. 1a is a partially sectional longitudinal view of one example of a generator in accordance with the invention, featuring a system of passageways for cooling a rectifier assembly, the stator, the exciter and for supplying oil to the shaft bearing.

The generator of FIG. 1a has a pot-shaped, cylindrical housing 12 which can be flange-mounted to a wall 11 of the engine housing, such as a gear case, driving a gear on the generator shaft 18. The generator has a stationary exciter core 14 with an exciter or field winding 13, an armature core 16 with an armature winding 15, and a windingless rotor 17 mounted on the shaft 18. Shaft 18 extends into the wall 11 of the engine on which it is mounted. A rectifier assembly is inside the housing 12 which includes one or more diodes 19 mounted on a heat sink 21. The shaft 18 rotates in a sleeve bearing 22 held in housing part 12a, secured to the wall of the engine housing 11.

The entire cooling circuit of the oil lies in stationary parts of the generator. The circuit cools the rectifier assembly 19, 21, the exciter core 13, and the armature core 16. It also lubricates the bearing 22, which can also be of any suitable and different type, e.g. a journal bearing or a low-friction bearing, e.g. a roller bearing or a ball bearing assembly.

The end face 12c of the housing 12 is provided with an oil inlet 23. The oil supply to this inlet 23 can come from the pressurized lubricating oil system of a reciprocating or turbine engine which drives the generator. From the inlet 23, the oil proceeds first to a chamber 42 formed within the housing 12 and also retaining the rectifier assembly 19, 21. A portion of the incoming oil is shunted across the end face of the exciter core 14 by a passageway 24 and meets again with the oil in the chamber in a common passageway 25 which provides an outlet at the bottom of the chamber 42. The common passageway 25 leads to a first annular passageway 26 formed as a groove in a stator housing 27 inserted in the generator housing 12. The oil flows in both directions in this groove around the stator housing 27 to a short connecting passageway 28 in the side of the housing 27 opposite that of passageway 25, and then through to the next groove 31 in the stator housing 27. The connecting passageway 28 between the grooves 26, 29 is twice the cross-sectional area of the grooves 26, 29 themselves, so that it can handle the greater flow without increased flow resistance. The oil now proceeds in the second groove 29 in a flow pattern which is opposite to that of the first groove, since it is now flowing again to the first side of the stator housing 27 at the bottom of FIG. 1a. A similar reversal occurs for later additional annular passageways 31, 33. Where the oil exits from the last of the grooves 33, a portion of it is led off to supply the bearing 22 with lubrication. For this, the oil passes through a bearing supply passageway 34 which is so dimensioned that it meters the correct amount of oil required by the bearing 22. The remaining part of the oil passes directly into the crankcase of the engine or the transmission housing of the turbine, as the case may be, through an outlet 35 to the other side of the bearing. Oil coming fom the bearing 22 is led off through a separate bearing oil outlet 36. Oil passageway 34 has a separate outlet 34' for connection to other components, not shown. The generator housing has three parts 12a, 12b and 12c suitably secured together. Part 12a forms an attachment element to the wall 11 of the prime mover.

Figure 1B:
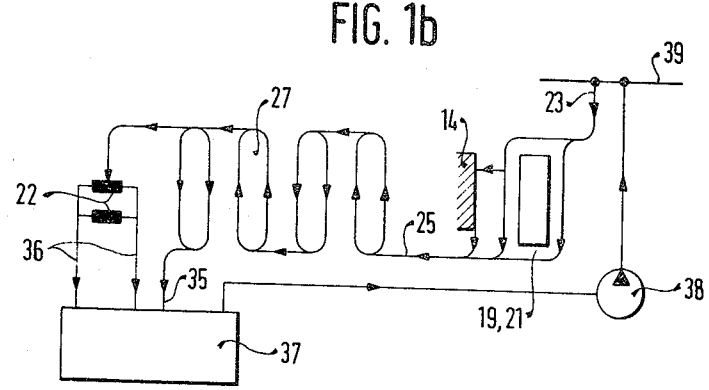

The oil flow circuit is schematically shown in FIG. 1b. The oil is pumped by a pump 38 from an oil sump 37 to pressurize an oil supply line 39. From there it flows through inlet 23 into chamber 42, past the rectifier assembly 19, 21 and the exciter core 14, then around the stator housing 27, and from there directly through the bearing 22 or passage 35 back to the sump 37.

Figure 2A:
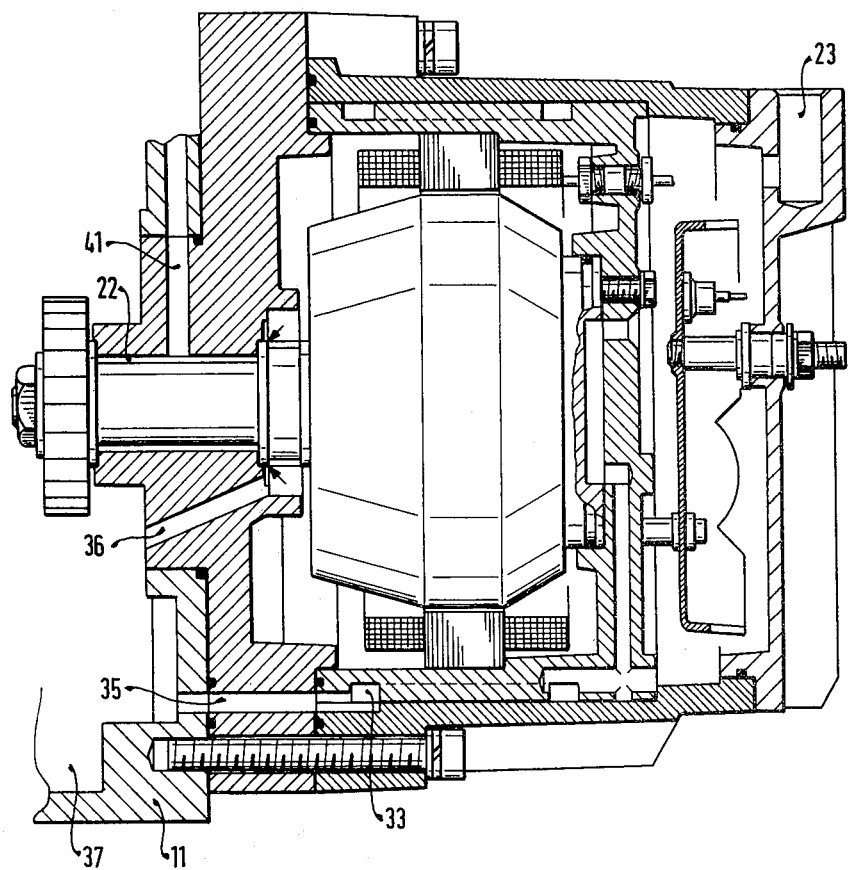
FIG. 2a is a partially sectional longitudinal view of a generator such as that of FIG. 1a, but having a separate oil supply passageway to the shaft bearing.

In the generator of FIG. 2a, the bearing 22 is cooled by lubricant separate from the cooling circuit in the generator. Lubrication oil is supplied independently of the cooling circuit for the remainder of the generator. As was the case for the generator of FIG. 1a, the cooling oil circuit here also begins at the inlet 23, but then at the last groove 33 proceeds through the passageway 35 and through the engine housing 11 back to the oil sump 37. The oil for the bearing 22 is provided by a separate oil supply passage 41 and then led off through the outlet passageway 36.

Figure 2B:
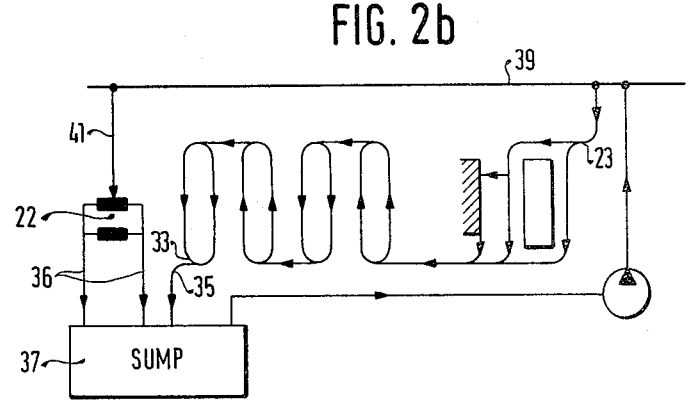
FIG. 2b is a schematic diagram of the oil flow in the generator of FIG. 2b.

FIG. 2b shows this circuit schematically.

Figure 3:
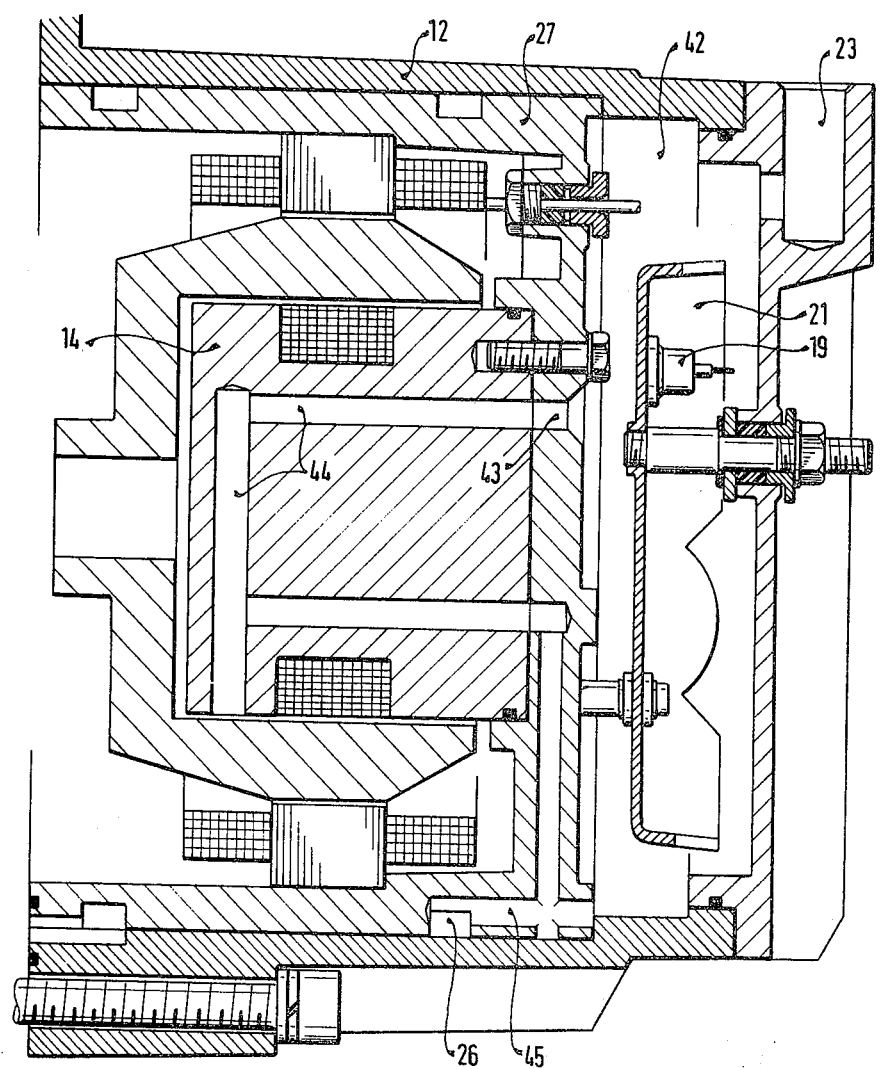
FIG. 3 is a partial longitudinal section of the electrical section of a generator such as those of FIGS. 1 and 2 and having a network of cooling oil passageways inside the exciter core.

In the generator of FIG. 3, the rectifier assembly 19, 21 is mounted within a special chamber 42 for it adjacent the end of the housing 12 and directly in the oil cooling circuit. The oil supply flows from the inlet 23 through the chamber 42 with the rectifier assembly 19, 21 and also through the passageway 43 in the stator housing 27 into passage 44 in the exciter core, which is also secured to the stator housing 27. In contrast to the generator of FIG. 1a, in which there is a passageway 24 at the end face of the exciter core 14, the generator of FIG. 3 has a network of passageways 44 leading through the exciter core 14. The passageway 45 leads the entire oil stream to a first annular groove 26 in the stator housing 27.

Figure 4:
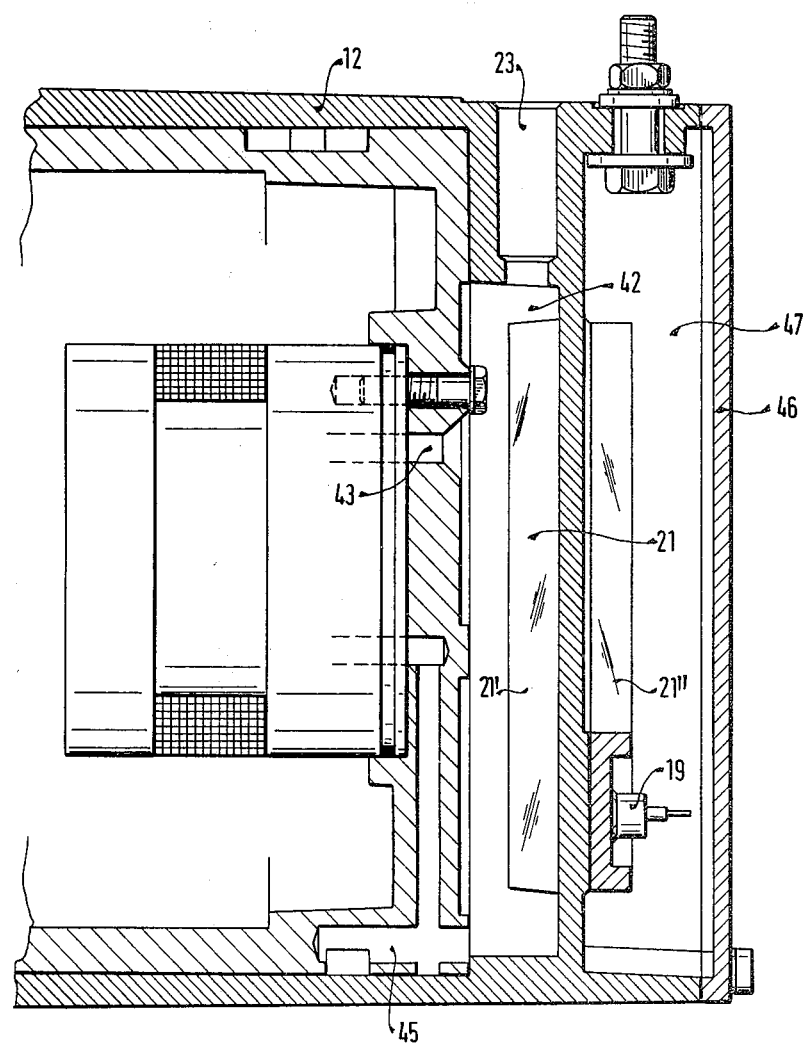
FIG. 4 is a partial longitudinal section of a portion of a generator such as that of FIG. 3 in which one side of a diode heat sink is dry.

Embodiment of FIG. 4: The generator is generally similar to the embodiment of FIG. 3. The plate 21 of the support for the rectifiers 19 of the rectifier array, however, subdivides the end portion of the generator to define two chambers, one the oil chamber 42 and the other a dry chamber 47. The dry chamber 47 is closed off by cover plate 46. The diodes 19 are all placed at the dry side of the support plate 21. Support plate 21 has fins 21' and 21'' extending, respectively, into the dry chamber 47 and into the oil chamber 42, where the plate 21 and the cooling fins 21' are cooled by oil circulated from inlet opening 23 and connected to the pressurized lubricating circuit 37, 38, 39 (FIG. 1a). The electrical connections are preferably placed in, or extending from the dry chamber 47. Oil circulation grooves and connections can be formed in body 27.

Figure 5:
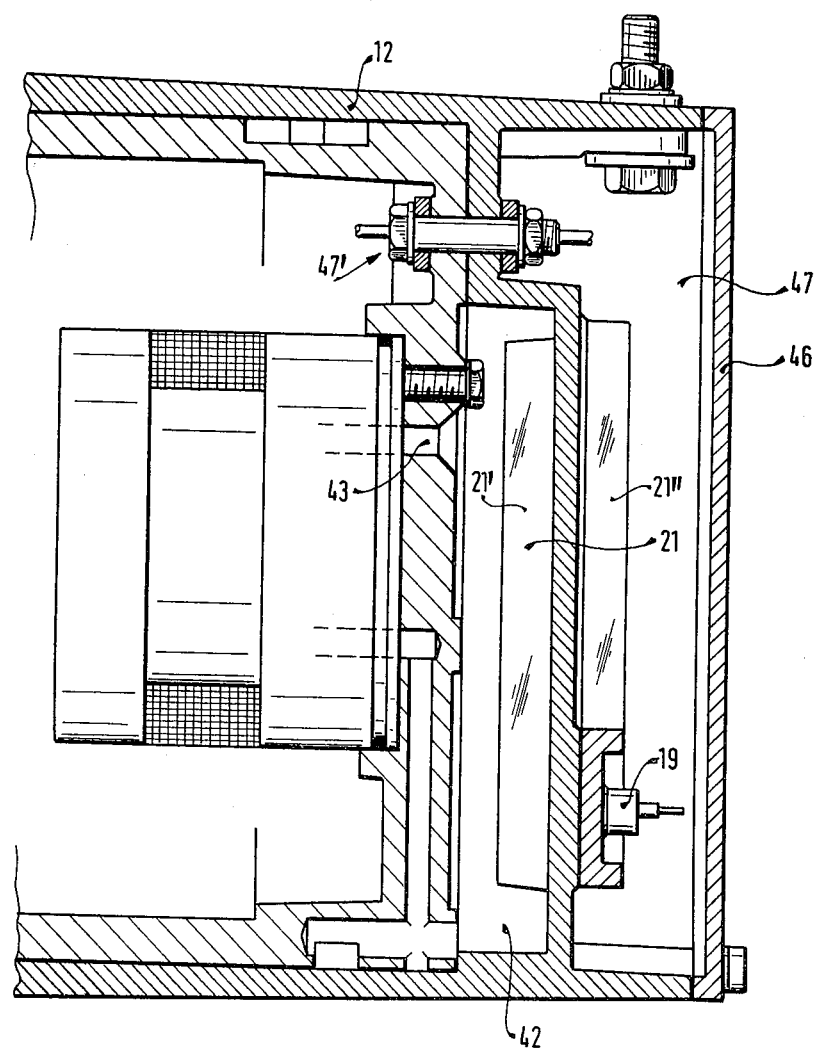
FIG. 5 is a partial longitudinal section of a portion of a generator such as that of FIG. 4 in which electrical feed-throughs from the interior are also dry.
Figure 6:
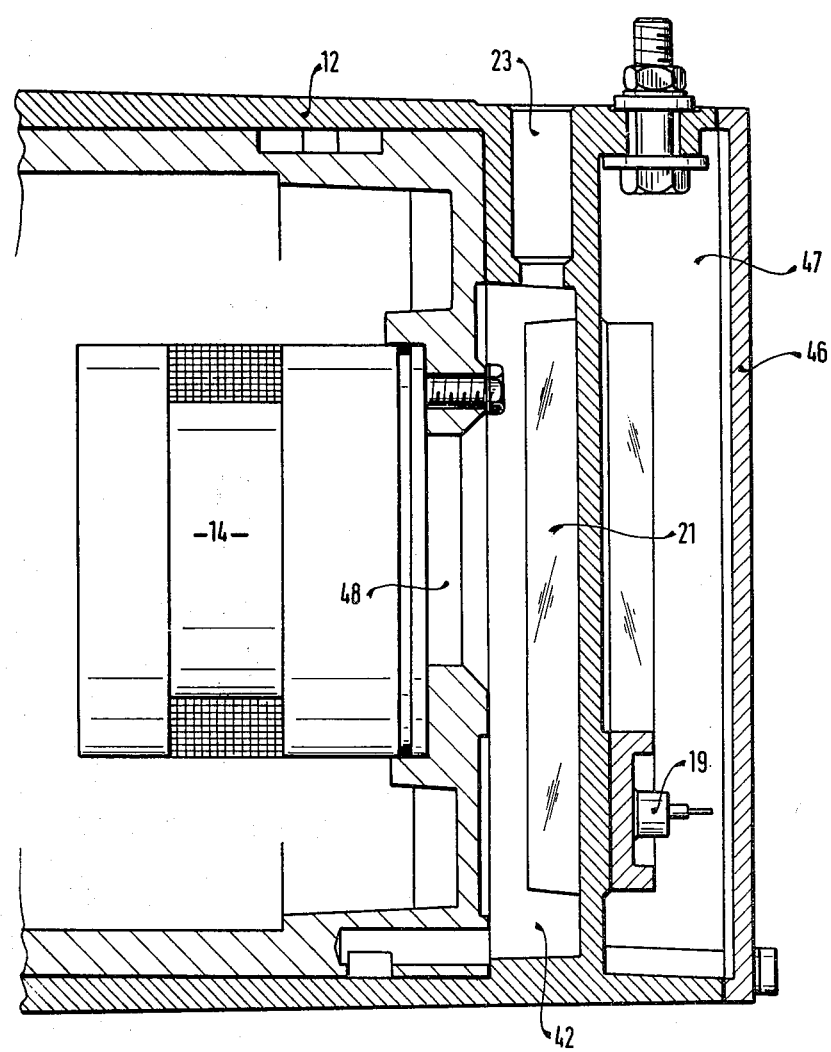
FIG. 6 is a partial longitudinal section of a portion of a generator such as that of FIG. 5 in which instead of a network of passageways in the exciter there is simply a large end surface of the core expos-d to the oil.

FIGS. 5 and 6 show further modifications of the generator of FIG. 4. All the electrical feed-throughs within the generator and all the connections to the outside, both in an axial and radial direction, lie to the outside of the cooling oil circuit and are therefore dry. A voltage regulator can be mounted either on the cover plate 46, similar to part 12c (FIG. 1), or inside the dry chamber 47, as are the diodes 19. When the regulator is mounted inside the chamber 47, the excess heat is carried off by the cooling fins 21''.

FIG. 5 is shown rotated 90° with respect to FIG. 4 to show electrical feed-through 47'. Duct 23 is not visible. There is interior cooling of the exciter core 14, as in FIG. 4.

FIG. 6: The oil flows along an opening 48 in the end wall of housing 27 and thus over a major surface portion of the end face of the exciter core 14. In this way, the network of passageways in the exciter core 14 can be eliminated. There is no interior cooling of field core 14.

Figure 7A:
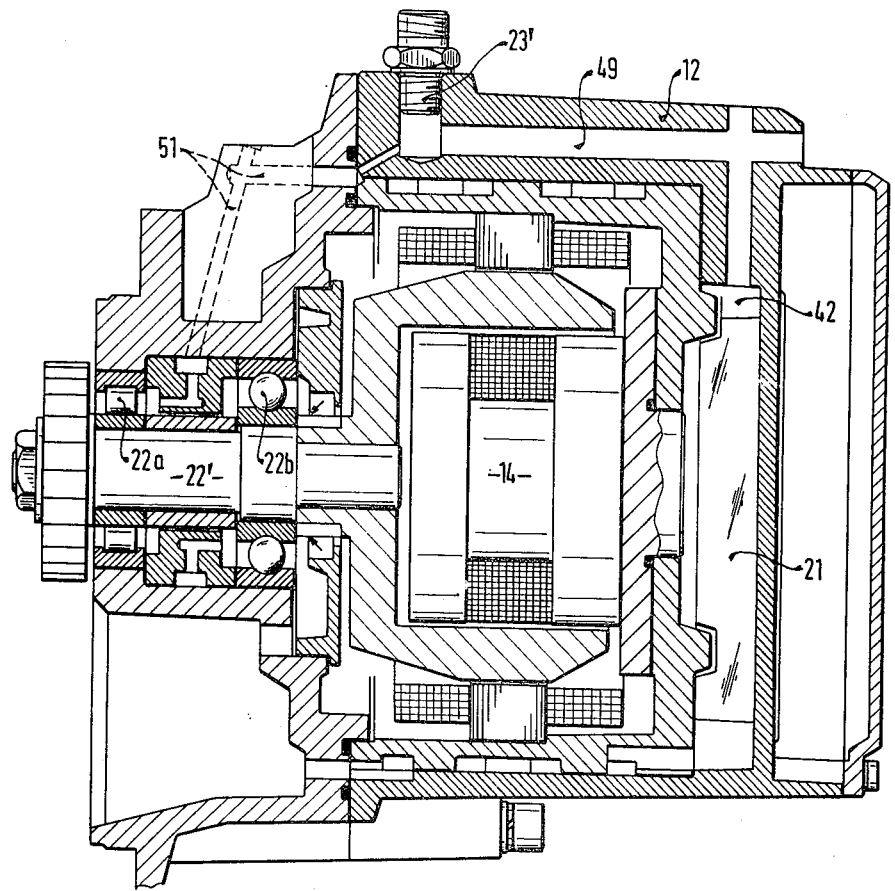
FIG. 7a is a partial longitudinal section of a generator such as that of FIG. 6, showing a shaft for the rotor and a bearing assembly for it which is supplied separately with oil for lubrication.

FIG. 7a shows a modified form of the generator of FIGS. 5 and 6, including a bearing assembly for the shaft 55. There is a common supply of cooling oil and lubricating oil at the bearing side of the generator which is also the side at which an attachment flange can be located. The oil supply is divided just after the inlet 23'. The greater portion of the fresh oil is led through a longitudinal passageway 49 in the housing 12 to the chamber 42 serving as oil chamber to cool the rectifier assembly. A small portion of the fresh oil is led from the inlet 23 directly to the bearing 22' by the passageway 51. The passageway 51 is appropriately dimensioned to meter the correct amount of oil to the bearing 22'. Bearing 22' has a roller portion 22a and a ball portion 22b.

Figure 7B:
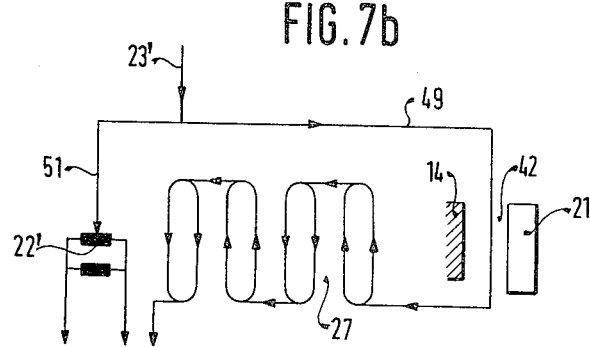

FIG. 7b shows schematically the cooling oil flow circuit in the generator of FIG. 7a.

Figure 8A:
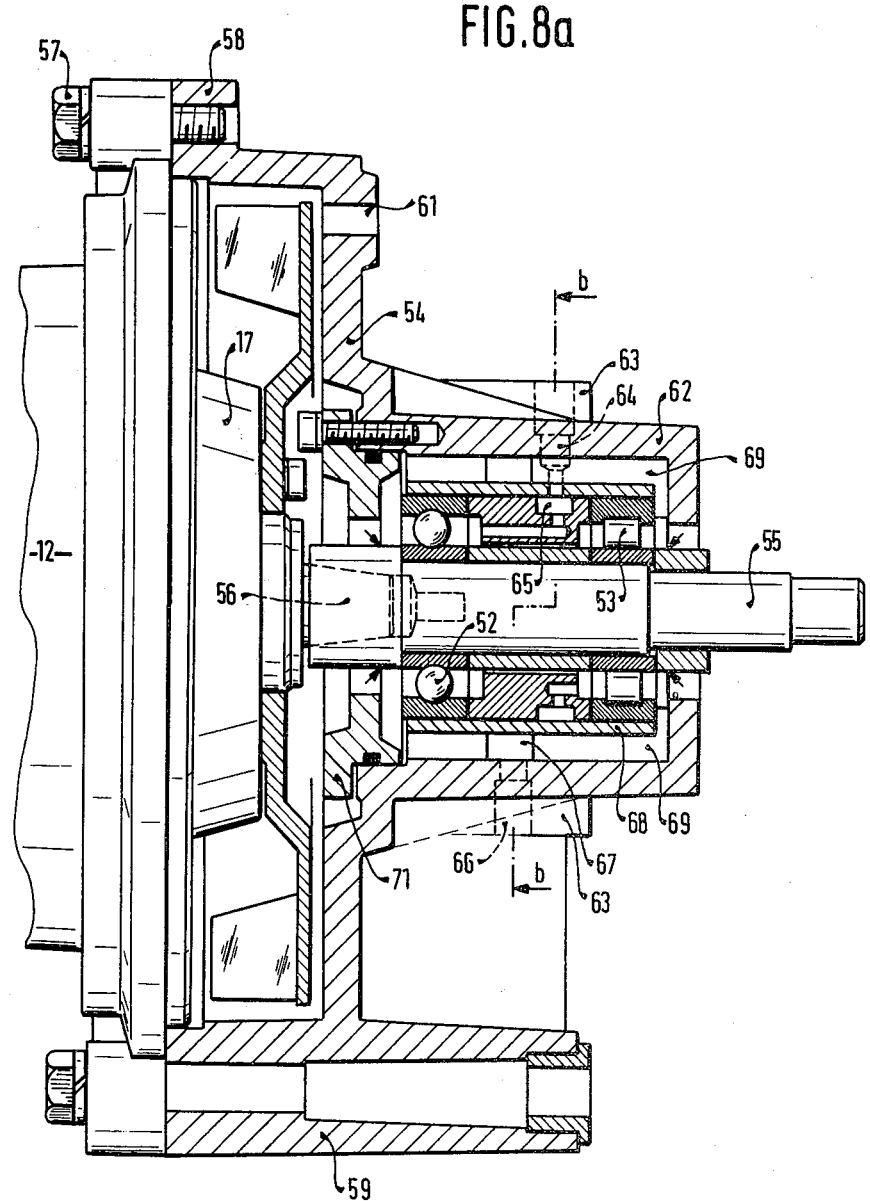
Figure 8B:
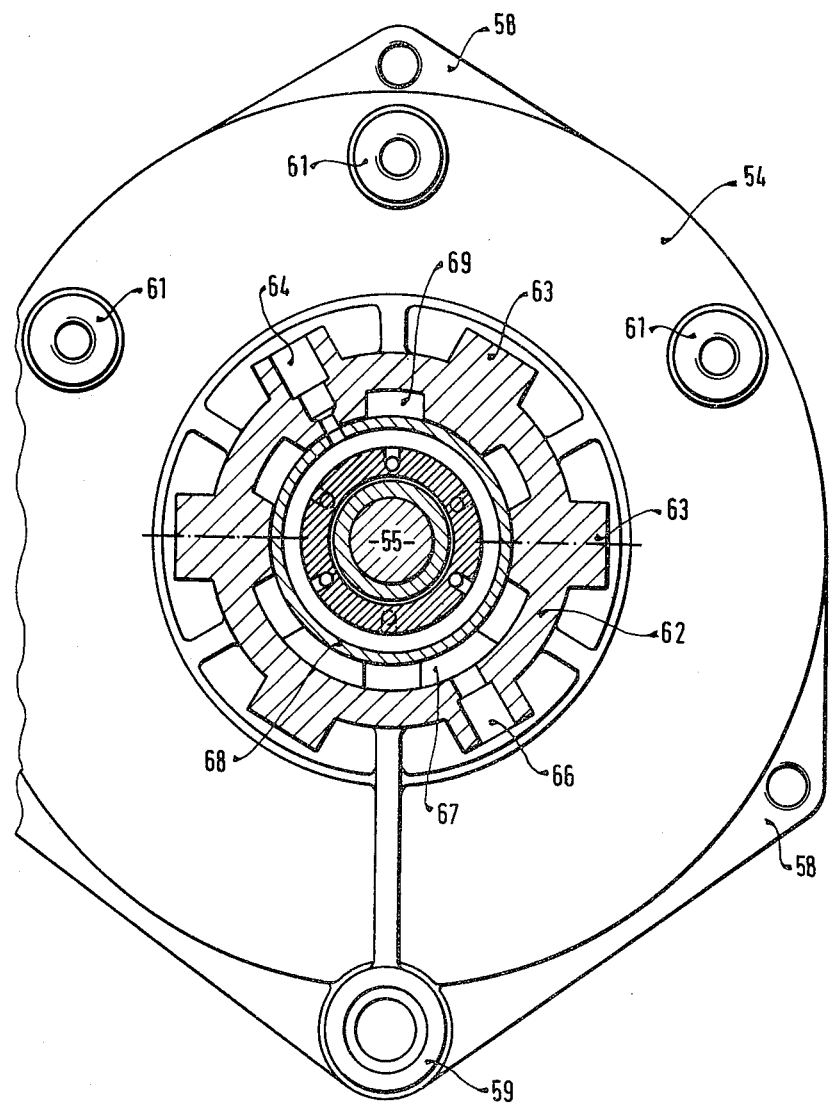

FIG. 8a shows in more detail, reversed left-for-right with respect to FIG. 7a, an alternative form of the shaft bearing assembly which is particularly suitable for a generator such as that of FIG. 7a. The assembly includes both a ball bearing 52 and a roller bearing 53. The size of the bearings 52, 53 and the spacing between them are so determined that both bearings will have the same lifetime, despite their unequal loading. The oil lubrication of both bearings 52, 53 is provided by the pressurized oil supply of the prime mover, e.g. a turbine or a reciprocating engine. A cone connection 56 connects the shaft 55 with the claw-pole rotor 17 of the generator. The stationary parts of the generator, including the housing 12, are secured with three or more bolts 57 to a flange 58 of the bearing block 54 and centered on fitting surfaces or with an adapter. A pivot fitting 59 is cast unitary with the bearing block 54. Three threaded holes 61 for tightening an adjustment bar, not shown, permit securing the generator in different positions (FIG. 8b). The hub 62 of the bearing support 54 has six or more lobes 63, each of which can be drilled to provide either an oil inlet 64 to an annular inlet groove 65 or an oil outlet 66 to an annular outlet groove 67. By providing a plurality of lobes 63, the same casting can be used, with passageways as needed, and still always locate the inlet on the top and the outlet at the bottom, regardless of the particular orientation position of the generator on its mounting. The hub 62 has a plurality of longitudinal channels 69 cast into its inner wall. An armor bushing 68 is pressed into the hub to cover the longitudinal channels from the inside and to thereby form a plurality of longitudinal channels in the hub through which lubricating oil can be supplied to the bearings 52 and 53 and then also led to the bearing outlet opening 66 with any installation position of the annular outlet groove 67. No longitudinal bores are required.

Figure 9:
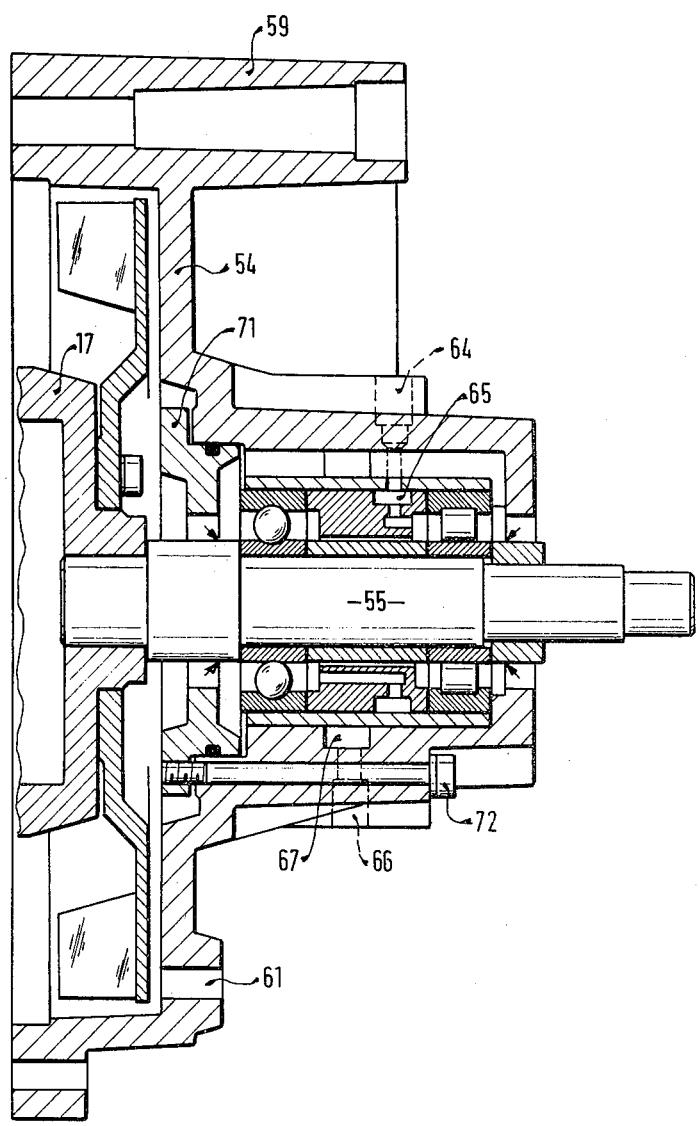
FIG. 9 shows the apparatus of FIG. 8a installed with a 180 degree angular displacement about the axis.

FIG. 9 shows the generator of FIG. 8 installed in a position rotated 180 degrees from that of FIG. 8, so that the pivot fitting 59 is at the top. For installation in this position, the cooling oil inlet 64 is drilled from the side of the pivot fitting 59 to the inlet groove 65. The outlet 66 is drilled on the opposite side and to the outlet groove 67. FIGS. 8a, 8b and 9 also show the rotor 17 heat-shrunk unto the shaft 55. A clamping plate 71 for the bearing support 54 is fastened to the bearing support from the outside with bolts 72, although it can be interiorly connected as shown in FIG. 8a.

Various changes and modifications may be made, and features described in connection with any one of the embodiments may be used with any of the others, within the scope of the inventive concept.

We claim:

1. Oil cooled electric generator and rectifier combination for association with an engine having a pressurized lubrication circuit (37, 38, 39) comprising
    a generator housing (12);
    a stator housing (27) located within said generator housing;
    a stator including an armature core (16) and an armature winding (15) and further including an exciter core (14) and a field winding on the exciter core, the exciter core being spaced from the armature core leaving a gap, the stator being positioned within the stator housing (27);
    a bearing (22) mounted within the generator housing (12);
    a shaft (18, 55) rotatable in the bearing;
    a claw-pole rotor (17) mounted on said shaft and rotatable within the gap between the armature core (16) and the exciter core (14);
    a rectifier assembly (19, 21) including at least one diode rectifier (19) and a support plate (21) therefor;
    cooling means to cool the generator and the rectifier assembly, connected to the pressurized lubrication circuit wherein
    the generator housing defines at least one oil space (42) adjacent an end wall of the exciter core (14) to permit direct contact of the oil supplied by the pressurized lubrication circuit and the exciter core, and wherein at least one of said housings (12, 27) is formed with at least one annular groove extending around the respective housing, or housings, and in fluid communication with said pressurized lubrication circuit for the flow of oil thereabout;
    at least one oil supply passageway (3, 4, 21, 63) in fluid communication with said pressurized lubrication circuit connected to and furnishing pressurized oil from said circuit to said bearing;
    oil duct means (23, 41) connecting said oil space and said oil supply passageways to said lubricating circuit to establish said oil flow connection from said pressurized lubrication circuit;
    wherein the support plate (21) defines a subdivision within said generator housing (12), said oil space (42) being located to one side of said support plate, the other side of said support plate, within said housing, defining a dry chamber (47);
    and wherein the at least one rectifier (19) is located within said dry space, the oil from the pressurized lubricating circuit cooling the support plate at the side remote from the location of the at least one rectifier diode.

2. Generator according to claim 1, wherein a plurality of annular grooves are provided, said grooves being formed in the outer wall of the stator housing (27).

3. Generator according to claim 1, wherein the grooves extend around the respective wall of the housing in parallel planes perpendicular to the axis of rotation of said shaft;
    and axially extending connecting grooves (28, 32) are formed in the housing to interconnect said circumferentially extending grooves (26, 29, 31, 33), the axially extending connecting grooves being alternately located at diametrically opposed positions within the respective housing to provide for counter-flow of oil in adjacent grooves.

4. Generator according to claim 1, wherein separate oil duct means (23, 41) are provided for said oil space (42) and for the bearing, respectively, to provide oil to the bearing direct from said pressurized lubricating circuit.

5. Generator according to claim 1, wherein the support plate is formed with cooling fins (21', 21'').

6. Generator according to claim 1, wherein said generator housing further comprises a bearing block located at one axial end of the housing, the bearing (22) being positioned within said bearing block;
    and wherein the oil duct means connecting the oil space and the oil supply passageways to the pressurized lubricating circuit is located adjacent said bearing block.

7. Generator according to claim 6, further including an attachment flange (58) to attach the generator to a support, the attachment flange being located adjacent to the bearing block, and formed with at least a portion of said oil duct means and oil supply passageways, the distribution of pressurized oil within said generator to, respectively, said oil space (42) and said bearing (22) being effected by intersecting passageways positioned within said flange.

8. Generator according to claim 1, further comprising a bearing block (54) retaining the bearing (22, 52, 53) therein;
    said bearing block being formed with a plurality of circumferentially positioned lobes (63);
    and wherein said oil duct means (64, 66) connecting the bearing to the pressurized lubricating circuit comprises bores formed in respective ones of said lobes to supply oil to, and drain oil from said bearing.

9. Generator according to claim 8, further comprising an attachment flange (58) to attach the generator to a support, the attachment flange and said bearing block being secured together;
    the attachment flange being formed with attachment means (61) to attach the generator to said support in a desired position, the respective plurality of lobes permitting placement of the oil duct means (64, 66) to extend in an essentially vertical direction and permit drainage of oil by gravity regardless of the orientation of the attachment means with respect to an essentially vertical direction.

10. Generator according to claim 1, wherein the bearing (22) comprises a composite bearing array including a roller bearing (53) and a ball bearing (52).

11. Generator according to claim 1, further comprising a shaft connection to connect the shaft (18) retaining the rotor to an external drive shaft, said shaft connection comprising a conical connection (56).

12. Generator according to claim 11, wherein said shaft connection is positioned between the bearing and the rotor.

13. Generator according to claim 1, wherein the rotor (17) is connected to the shaft (18) by a shrink fit.

14. Generator according to claim 1, wherein the bearing (22) comprises the combination of a ball bearing (52) and a roller bearing (53) axially spaced from each other, the spacing and load bearing and running characteristics of the ball bearing and the roller bearing, respectively, being matched to provide for essentially equal wear and lifetime.

15. Generator according to claim 1, further comprising a bearing block (54) within which the bearing (22) is positioned;

and wherein said oil duct means includes at least one longitudinal groove (69) formed in the bearing block and adjacent the bearing.

16. Generator according to claim 15, further including at least one circumferential groove (67) formed in the bearing block and adjacent the bearing.

* * * * *